(12) United States Patent
Maeda et al.

(10) Patent No.: US 9,790,123 B2
(45) Date of Patent: Oct. 17, 2017

(54) GLASS COMPOSITION FOR SEALING

(71) Applicant: NIHON YAMAMURA GLASS CO., LTD., Amagasaki-shi (JP)

(72) Inventors: Kozo Maeda, Amagasaki (JP); Yoshitaka Mayumi, Amagasaki (JP)

(73) Assignee: NIHON YAMAMURA GLASS CO., LTD., Hyogo (JP)

( * ) Notice: Subject to any disclaimer, the term of this patent is extended or adjusted under 35 U.S.C. 154(b) by 0 days.

(21) Appl. No.: 15/025,824

(22) PCT Filed: Sep. 24, 2014

(86) PCT No.: PCT/JP2014/075182
§ 371 (c)(1),
(2) Date: Mar. 29, 2016

(87) PCT Pub. No.: WO2015/046195
PCT Pub. Date: Apr. 2, 2015

(65) Prior Publication Data
US 2016/0236967 A1    Aug. 18, 2016

(30) Foreign Application Priority Data

Sep. 30, 2013 (JP) ................. 2013-203094

(51) Int. Cl.
| | | |
|---|---|---|
| *C03C 8/24* | (2006.01) | |
| *C03C 3/062* | (2006.01) | |
| *H01M 8/0282* | (2016.01) | |
| *H01M 8/0286* | (2016.01) | |
| *C03C 3/078* | (2006.01) | |
| *C03C 3/095* | (2006.01) | |
| *H01M 8/124* | (2016.01) | |

(52) U.S. Cl.
CPC ............... *C03C 8/24* (2013.01); *C03C 3/062* (2013.01); *C03C 3/078* (2013.01); *C03C 3/095* (2013.01); *H01M 8/0282* (2013.01); *H01M 8/0286* (2013.01); *H01M 2008/1293* (2013.01)

(58) Field of Classification Search
CPC ........... C03C 3/062; C03C 3/095; C03C 8/02; C03C 8/04; C03C 8/24
See application file for complete search history.

(56) References Cited

U.S. PATENT DOCUMENTS

| | | | |
|---|---|---|---|
| 5,298,332 A | 3/1994 | Andrus et al. | |
| 2009/0286664 A1 | 11/2009 | Drake et al. | |
| 2010/0180636 A1* | 7/2010 | Liu ........................... | C03C 8/24 65/33.5 |
| 2010/0184580 A1* | 7/2010 | Liu ........................... | C03C 8/02 501/14 |
| 2015/0031524 A1* | 1/2015 | Takayama ................. | C03C 8/24 501/14 |

FOREIGN PATENT DOCUMENTS

| | | |
|---|---|---|
| JP | 3-170682 | 7/1991 |
| JP | 2006-56769 | 3/2006 |
| JP | 2011-522361 | 7/2011 |
| JP | 2012-162445 | 8/2012 |
| JP | 2012-519149 | 8/2012 |
| JP | 2012162445 A * | 8/2012 |
| JP | 2014-156377 | 8/2014 |
| WO | 2010099939 | 9/2010 |
| WO | 2013/161560 | 10/2013 |
| WO | 2014/103973 | 7/2014 |

OTHER PUBLICATIONS

International Search Report of PCT/JP2014/075182, dated Dec. 3, 2014, and English translation, 4 pages total.

* cited by examiner

*Primary Examiner* — Elizabeth A Bolden
(74) *Attorney, Agent, or Firm* — Hamre, Schumann, Mueller & Larson, P.C.

(57) ABSTRACT

Disclosed is a sealing glass composition substantially not containing $B_2O_3$ or $Al_2O_3$, which is a high-strength, high-expansive crystallizing glass composition that can be used at high temperatures of not less than 950° C. The composition substantially not containing boron oxide, alkali metal oxides or aluminum oxide, but containing, in mol %, $SiO_2$: 40-55, BaO: 18-35, $TiO_2+ZrO_2$: 0.1-10, ZnO: 0-15, CaO: 0-20, MgO: 0-9, SrO: 0-5, and $La_2O_3$: 0-2, wherein the total content of RO (R: Mg, Ca, Sr, Ba and Zn) is at least 44 mol %, and wherein the glass composition, when fired in the form of glass powder at a temperature of 850-1050° C, turns into a crystallized glass that exhibits a thermal expansion coefficient of $90\text{-}150 \times 10^{-7}/°$ C. in the range of 50-850° C.

11 Claims, No Drawings

GLASS COMPOSITION FOR SEALING

TECHNICAL FIELD

The present invention relates to a glass composition for use in providing a seal between metals, or a metal and a ceramic, and more specifically to such a sealing glass composition that is used as a sealant for sealing between each of solid oxide fuel cells (SOFC) and a metal to which it is fixed or between metals, as well as for exhaust gas sensors, and the like, as a sealant.

BACKGROUND ART

While there are needs for a sealant used in solid oxide fuel cells (SOFC), it is prerequisite that such a sealant would neither degrade nor melt when exposed to high temperatures for an extended length of time, for it is a material which is to be exposed to temperatures as high as 600-800° C. for a long time. Crystallized glass has been proposed as a type of material meeting this requirement. It is also required for such a sealant to have certain flowability of the glass during the firing process, so as to provide a secure seal between various members like metals and ceramics.

At the same time, there is a problem that $B_2O_3$, a component of glass, evaporates while the sealant is kept at high temperatures and contaminates electrodes. Thus, development of a sealant is desired that does not contain evaporating components, in particular, $B_2O_3$.

Currently, many compositions for crystallized glass which have been developed so far for sealing SOFC contain $B_2O_3$ or alkali metal oxides (Patent Documents 1 and 2). While $B_2O_3$-free glass has also been developed (Patent Document 3), and $SiO_2$—MgO-based glass is also known (Patent Document 4), they have a drawback in that they provide only insufficient crystallization. Further, those types of glass are not only apt to have higher crystallization temperatures than other glass which contain $B_2O_3$ or alkali metal oxides, but also exhibit greater viscosity during glass production, making it difficult to form them.

PRIOR ART DOCUMENTS

Patent Documents

[Patent Document 1] JP2012-519149
[Patent Document 2] JP2006-56769
[Patent Document 3] JP2011-522361
[Patent Document 4] JP2012-162445

DISCLOSURE OF INVENTION

Problem Solved by the Invention

Against the above-mentioned background, it is an objective of the present invention to provide a composition that after firing at or over 850° C., gives a high strength, high-expansive crystallized glass composition usable at high temperatures of 950° C. or over, and containing no $B_2O_3$ nor $Al_2O_3$.

Means to Solve the Problem

Addressing the problem of insufficient crystallization of the glass disclosed in Patent Document 3 mentioned above, the present inventors focused on the balance between the amount of certain metal oxides RO (R: Mg, Ca, Sr, Ba and Zn), which are glass-modifying oxides, and the amount of the glass forming oxide ($SiO_2$), in the entire composition of the glass. Further, to the problem of insufficient crystallization of the glass described in Patent document 4, the focus was placed on the presence of $B_2O_3$ or the absence of components like $TiO_2$ and $ZrO_2$ in the glass.

As a result of the study pursued to solve the above problems, the inventors found that if its components fall within a certain range, $SiO_2$—BaO—$TiO_2/ZrO_2$-based glass ("$TiO_2/ZrO_2$" means that one or both of these components are contained), when subjected to firing at 850-1050° C. in the form of powder, will give high-strength glass ceramic that exhibits a highly linear thermal expansion curve and has a thermal expansion coefficient of $90\text{-}150\times10^{-7}$/° C. (50-850° C.), a value which fits to metal and ceramic. The present invention has been completed through additional studies based on that finding.

Thus the present invention provides what follows:

1. A sealing glass composition substantially not containing boron oxide, alkali metal oxides or aluminum oxide, but containing, in mol %,

| | |
|---|---|
| $SiO_2$ | 40-55 |
| BaO | 18-35 |
| $TiO_2 + ZrO_2$ | 0.1-10 |
| ZnO | 0-15 |
| CaO | 0-20 |
| MgO | 0-9 |
| SrO | 0-5, and |
| $La_2O_3$ | 0-2, | wherein the total content of RO (R: Mg, Ca, Sr, Ba and Zn) is at least 44 mol %, and wherein the glass composition, when fired in the form of glass powder at a temperature of 850-1050° C., turns into a crystallized glass that exhibits a thermal expansion coefficient of $90\text{-}150\times10^{-7}$/° C. in the range of 50-850° C.

2. The sealing glass composition of 1 above substantially not containing boron oxide, alkali metal oxides or aluminum oxide, but containing, in mol %,

| | |
|---|---|
| $SiO_2$ | 45-50 |
| BaO | 18-35 |
| $TiO_2 + ZrO_2$ | 1-10 |
| ZnO | 4-15 |
| CaO | 1-15 |
| MgO | 1-9 |
| SrO | 0-5, and |
| $La_2O_3$ | 0-2, | wherein the total content of RO (R: Mg, Ca, Sr, Ba and Zn) is at least 44 mol %, and wherein the glass composition, when fired in the form of glass powder at a temperature of 850-1050° C., turns into a crystallized glass that exhibits a thermal expansion coefficient of $90\text{-}150\times10^{-7}$/° C. in the range of 50-850° C.

3. The sealing glass composition of 1 or 2 above substantially not containing boron oxide, alkali metal oxides or aluminum oxide, but containing, in mol %,

| | |
|---|---|
| $SiO_2$ | 45-50 |
| BaO | 20-30 |
| $TiO_2 + ZrO_2$ | 1-7 |
| ZnO | 6-15 |
| CaO | 3-10 |
| MgO | 3-7 |

-continued

| | |
|---|---|
| SrO | 0-5, and |
| $La_2O_3$ | 0.1-1, | wherein the total content of RO (R: Mg, Ca, Sr, Ba and Zn) is at least 44 mol %, and wherein the glass composition, when fired in the form of glass powder at a temperature of 850-1050° C., turns into a crystallized glass that exhibits a thermal expansion coefficient of $90\text{-}150\times10^{-7}/°$ C. in the range of 50-850° C.

4. The sealing glass composition of one of 1-3 above substantially not containing boron oxide, alkali metal oxides or aluminum oxide, but containing, in mol %,

| | |
|---|---|
| $SiO_2$ | 45-50 |
| BaO | 20-30 |
| $TiO_2 + ZrO_2$ | 1-7 |
| ZnO | 6-15 |
| CaO | 3-10 |
| MgO | 3-7 |
| SrO | 0-5, and |
| $La_2O_3$ | 0.1-0.6, | wherein the total content of RO (R: Mg, Ca, Sr, Ba and Zn) is at least 44 mol %, and wherein the glass composition, when fired in the form of glass powder at a temperature of 850-1050° C., turns into a crystallized glass that exhibits a thermal expansion coefficient of $90\text{-}150\times10^{-7}/°$ C. in the range of 50-850° C.

5. The sealing glass composition of 1 above substantially not containing boron oxide, alkali metal oxides or aluminum oxide, but containing, in mol %,

| | |
|---|---|
| $SiO_2$ | 43-55 |
| BaO | 18-35 |
| $TiO_2 + ZrO_2$ | 0.1-10 |
| ZnO | 0-15 |
| CaO | 0-20 |
| MgO | 0-less than 5 |
| SrO | 0-5, and |
| $La_2O_3$ | 0-1, | wherein the total content of RO (R: Mg, Ca, Sr, Ba and Zn) is at least 44 mol %, and wherein the glass composition, when fired in the form of glass powder at a temperature of 850-1050° C., turns into a crystallized glass that exhibits a thermal expansion coefficient of $90\text{-}140\times10^{-7}/°$ C. in the range of 50-850° C.

6. The sealing glass composition of 1 or 5 above substantially not containing boron oxide, alkali metal oxides or aluminum oxide, but containing, in mol %,

| | |
|---|---|
| $SiO_2$ | 45-52 |
| BaO | 22-30 |
| $TiO_2 + ZrO_2$ | 1-7 |
| ZnO | 6-15 |
| CaO | 1-10 |
| MgO | 3-less than 5 |
| SrO | 0-5, and |
| $La_2O_3$ | 0-0.6, | wherein the total content of RO (R: Mg, Ca, Sr, Ba and Zn) is at least 44 mol %, and wherein the glass composition, when fired in the form of glass powder at a temperature of 850-1050° C., turns into a crystallized glass that exhibits a thermal expansion coefficient of $90\text{-}140\times10^{-7}/°$ C. in the range of 50-850° C.

7. The sealing glass composition of one of 1-6 above comprising one or more chemical species selected from $CeO_2$, $Yb_2O_3$ and $Y_2O_3$ at 0-2 mol % in total.

8. Glass powder consisting of the sealing glass composition of one of 1-7 above.

9. The glass powder of 8 above, wherein the mean particle size thereof is 2-25 μm.

10. The glass powder of 8 or 9 above further containing a ceramic filler.

11. A solid oxide fuel cell sealed with the fired body formed by firing the powder of one of 8-10 above.

Effect of the Invention

The present invention described above enables provision of such a powder of glass composition that when fired, crystallizes to form a high-strength, high-expansive crystallized glass substantially not containing $B_2O_3$ or $Al_2O_3$. Therefore, it can be used as a sealant for such positions at which a seal must be provided between a metal and a ceramic, between metals or between ceramics that are used at high temperatures (e.g., sealing positions of solid oxide fuel cells or exhaust gas sensors). As it will not lose its electrical insulation property when exposed to high temperature conditions of 700-1000° C. for an extended length of time, nor will it exhibit lowering viscosity at such high temperatures, its application to sealing positions as a sealant will provide a fortified insulation property as well as durability of the seal.

MODE FOR CARRYING OUT THE INVENTION

The range of the content of each component and the reason for which it is set as such are as follows.

Considering that the glass composition for sealing of the present invention is to be subjected to firing in the powder form at 850-1050° C., its softening point, though a rough guide, is preferably in the range of approximately 700-900° C., and more preferably in the range of approximately 700-850° C.

In the present invention, $SiO_2$ is a glass network former oxide, and is preferably contained in the range of 40-55 mol %. If the content of $SiO_2$ is below 40 mol %, either glass may not be formed or if it is, it could be formed only with difficulty. If the content of $SiO_2$ exceeds 55 mol %, the softening point could go up too high, thereby making it impossible provide a seal at low temperatures. Considering such factors as glass formability and softening point, the range of 45-50 mol % is more preferred.

BaO is a component that lowers the softening point and increases the expansion coefficient, and also a component that enhances glass formability. It is preferably contained in the range of 18-35 mol %. If the content of BaO is below 18 mol %, although glass may be formed, too high a softening point might result or no increase of expansion coefficient could be achieved after crystallization. Further, if the content of BaO exceed 35 mol %, too low a crystallization temperature might result, though glass may be formed. Considering such factors as the softening point and the expansion coefficient of the glass obtained, the content of BaO is more preferably 20-30 mol %.

$TiO_2$ and $ZrO_2$ are components that promote crystal formation and improve weather resistance of the glass. Either one or both of them may be contained, preferably at 0.1-10 mol % in total. If the total content of $TiO_2$ and $ZrO_2$ is below 0.1 mol %, insufficient crystallization may result after firing, whereas if it exceeds 10 mol %, poor flowability could result during firing or they might remain unmelted. Either of these cases is undesirable. Considering such factors as the degree of crystallization achieved after firing the glass obtained and its weather resistance, the total content of $TiO_2$ and $ZrO_2$ is more preferably 1-10 mol %, and still more preferably 1-7 mol %.

ZnO is a component that is effective in lowering the softening point and enhancing the flowability. Though it is not an essential component of the present invention, it is preferable that ZnO is contained in an amount not more than 15 mol %. If the content of ZnO exceeds 15 mol %, though glass may be formed, no increase of expansion coefficient could be achieved after crystallization. Considering the flowability and the softening point of the glass obtained as well as its expansion coefficient after crystallization, the content of ZnO is more preferably 1-15 mol %, still more preferably 4-15 mol %, and particularly preferably 6-15 mol %.

CaO is component that enhances glass formability. Though it is not an essential component of the present invention, it is preferable that CaO is contained in an amount not more than 20 mol %. If the content of CaO exceeds 20 mol %, no increase in the degree of crystallization could be achieved after firing. Considering such factors as formability of the glass obtained, and the degree of crystallization to be achieved after firing, the content of CaO is more preferably 1-15 mol %, and more preferably 3-10 mol %.

MgO is a component that enhances glass formability. Though it is not an essential component of the present invention, it is preferable that MgO is contained at not more than 9 mol %. If the content of MgO exceeds 9 mol %, either no glass could be obtained or too low a crystallization temperature might result. Considering such factors as flowability, softening point, coefficient of expansion after crystallization, the content of MgO is more preferably 1-9 mol %, and still more preferably 3-7 mol %. Further, the content of MgO may be, e.g., below 5 mol %, or not more than 4.8 mol %, not more than 4.5 mol %, and so on. Thus it may be in such ranges as 0-below 5 mol %, 0-4.8 mol %, 0-4.5 mol %, or the like. Still further, the lower limit of these ranges may, similarly to the above, be 1 mol %, 3 mol % or the like, instead of 0 mol %.

SrO is a component that improves glass formability. Though it is not an essential component of the present invention, SrO may be contained up to 5 mol %. If the content of SrO exceeds 5 mol %, either glass could not be obtained or too low a crystallization temperature might result.

$La_2O_3$ is a component useful for keeping adhesive strength to a metal, and it is also a component with which the starting temperature of crystallization can be adjusted. Though it is not an essential component, $La_2O_3$ may be contained at not more than 2 mol %. If its content exceeds 2 mol %, $La_2O_3$ will raise the starting temperature of crystallization, thereby causing an increase of the glass portion remaining behind, which is undesirable. The content of $La_2O$ is more preferably 0.1-1 mol %, and still more preferably 0.1-0.6 mol %.

In addition to the components mentioned above and insofar as not contradictory to the objective of the present invention, one or more oxides selected from $Fe_2O_3$, CoO, NiO, and $Ln_2O_3$ (Ln: lanthanoids other than lanthanum: such as Ce, Yb, and Y), $Ln_2O_3$ if naming an example, may be contained at not more than 2 mol % in total, for the purpose of improving the stability of the glass during production, suppressing reactions with metals, improving adhesion between metals and the glass sealant, and adjusting the species of precipitating crystals and their proportion. In the above, Ln may be restricted to exclude lanthanoids other than lanthanum and yttrium, in which case the composition of the present invention does not contain $Y_2O_3$.

In contrast to the above-mentioned components that may be contained in the sealing glass composition of the present invention, $B_2O_3$ is a component that while helping stabilize the glass state in the process of glass production, would evaporate when kept at a high temperature, and thus could contaminate electrodes. Therefore, it is preferred that the sealing glass composition of the present invention substantially does not contain $B_2O_3$.

It is also preferred that the sealing glass composition of the present invention substantially does not contain alkali metals such as Na and K, for their reaction with metals is tends to be accelerated at high temperatures.

$Al_2O_3$ is a component that while helping stabilize the glass state in the process of glass production, would increase the viscosity of the glass at high temperatures and thereby make it hard to be formed, or would elevate the crystallization temperature. It is thus preferred that the composition substantially does not contain $Al_2O_3$.

In the above, the phrase "substantially does not contain" is not intended to prohibit any of contaminant level inclusion, but to allow such inclusion that is merely at a level of contaminants in the raw materials employed for glass production. More specifically, with regard to boron oxide, alkali metal oxides, and aluminum oxide, the present invention is deemed "substantially not containing" them if their total content is not more than 2000 ppm as calculated as oxides, for such a content will cause no substantial problem in the sealing glass composition of the present invention.

As it is required that the glass powder consisting of the glass composition of the present invention first shrink during firing and then soften and flow to wet metal or ceramic surfaces, it must exhibit high flowability during firing. In connection with this, fine powder consisting of particles of too small sizes is not preferable, for it will start crystallizing too early, which then will reduce the composition's flowability during firing and hinder its flow, and thereby require increased rounds of application and firing of the sealant, leading to growing costs of production. On the other hand, coarse powder consisting of particles of too large sizes will cause problems that the particles of the powder settle and separate when the powder is made into a paste or while it is applied and dried, and also that uneven and insufficient crystallization will likely take place and lead to a reduced strength. The mean particle size of the glass powder of the present invention is preferably not less than 2 μm, more preferably not less than 4 μm, yet preferably not more than 25 μm, more preferably not more than 15 μm, and still more preferably not more than 10 μm. Further, its maximum particle size is preferably not more than 150 μm, and more preferably not more than 100 μm. Besides, in the present specification, the term "mean particle size" is a volume-based value (in which the total volume of the particles falling within each "particle size interval" in the particle-size distribution is recorded as their "frequency"). Adjustment of the particle size may be done by tuning the conditions of pulverization, and if needed, by further removing fine and coarse particles using a conventional means such as classification.

Thus, adjustment may be made to achieve, for example, mean particle size of 25 μm along with maximum particle size of not more than 150 μm; mean particle size of 15 μm along with maximum particle size of 100 μm; mean particle size of 5 μm along with maximum particle size of not more than 100 μm; or mean particle size of 3.0 μm along with maximum particle size of 15 μm, and so on.

The sealing glass composition of the present invention may be used in the form of glass powder, or as its mixture with ceramic powder, to seal a metal and a ceramic. In providing a seal, the composition can be applied to the object by such means as printing or with dispenser, and then fired at 850-1050° C. It may also be mixed with a molding aid, then dry pressed, calcined at a temperature near the softening point of the glass to form a compact, and combined with the above paste.

Further, in order for fine adjustment of thermal expansion, as well as boosting crystallization of the glass for improved strength, ceramic fillers may be added to the glass powder in such an amount as causing no decrease in the composition's flowability during firing. There will be no effect if the amount added is less than 0.01 wt % relative to the amount of the glass powder, while if the amount added exceeds 20 wt %, the flowability of the composition will be reduced and its flow during firing will be hindered, both of which are undesirable. Thus, their amount is preferably 0.01-20 wt %, and more preferably 0.1-10 wt %.

Examples of ceramic fillers include alumina, zirconia, preferably partially stabilized zirconia, magnesia, forsterite, steatite, wollastonite, and barium titanate.

Their mean particle size is preferably not more than 20 μm, more preferably not more than 5 μm, and still more preferably not more than 3 μm, while their maximum size is not more than 106 μm, more preferably not more than 45 μm, and still more preferably not more than 22 μm.

EXAMPLES

While the present invention will be described in further detail with reference to typical examples, it is not intended that the present invention be limited to those examples.

[Preparation of Glass and Glass Powder]

Examples 1-46, 47-48, and Comparative Examples 1-2

Raw materials were combined and mixed so as to give each of the glass compositions shown in Table 1-1 to Table 4-2, and Table 6, and the mixture of raw materials was put in a platinum crucible, melted for 2 hours at 1400-1500° C., and formed into glass flakes. The glass flakes then were put in a pot mill and ground until a mean particle size of 5-10 μm was reached. Coarse particles were removed using a sieve with the pore size of 106 μm, giving the respective glass powders of Examples 1-46 and Comparative Examples 1-2. Further, the glass powders of Examples 41 and 43 were mixed with a filler (barium titanate) as shown in Table 5 to prepare the powders of Examples 47 and 48, respectively.

[Test Method]

By the methods described below, each glass powder of Examples and Comparative Examples was measured for its softening point, peak crystallization temperature, and mean particle size, and also, after a pressed powder compact of it was fired, its flow diameter and coefficient of thermal expansion, for evaluation.

(1) Softening Point (Ts), Peak Crystallization Temperature (Tp)

Approximately 40 mg of each powder was put in a platinum crucible, and its softening point (Ts) and peak crystallization temperature (Tp) were measured on a DTA analyzer (Thermo Plus TG8120, mfd by RIGAKU) by raising the temperature at a rate of 20° C./min starting from the room temperature. Besides, powders with which (Tp-Ts) is less than 80° C. have a problem in their flowability.

(2) Mean Particle Size of Glass Powder ($D_{50}$)

$D_{50}$ in the volume distribution mode was measured using a laser diffraction particle size distribution analyzer.

(3) Flow Diameter of Pressed Powder Compact

Each of the powders obtained above was put in a mold having the inner diameter of 20 mm, press formed, and then fired at 900° C. The diameter of the fired body thus produced was measured as the flow diameter.

(4) Coefficient of Thermal Expansion

Each fired body produced in (3) above was cut out with the size of 5×5×15 mm to prepare a test piece. The coefficient of thermal expansion (a) of the test piece was determined based on the two points, at 50° C. and 850° C., on the thermal expansion curve that was produced by a TMA analyzer by raising the temperature at a rate of 10° C./min starting from the room temperature.

Examples 1-9

The respective compositions of the glass of Examples 1-9 and their physical properties are shown in Tables 1-1 and 1-2 below.

TABLE 1-1

| Composition | Example 1 | | Example 2 | | Example 3 | | Example 4 | | Example 5 | |
|---|---|---|---|---|---|---|---|---|---|---|
| | mol % | wt % | mol % | wt % | mol % | wt % | mol % | wt % | mol % | wt % |
| $SiO_2$ | 40.00 | 27.32 | 40.00 | 27.73 | 43.00 | 29.38 | 43.00 | 29.77 | 49.00 | 32.97 |
| BaO | 25.00 | 43.59 | 24.00 | 42.47 | 24.00 | 41.86 | 24.00 | 42.41 | 26.00 | 44.65 |
| $TiO_2$ | 9.00 | 8.18 | 5.00 | 4.61 | — | — | 5.00 | 4.60 | 4.00 | 3.53 |
| $ZrO_2$ | — | — | — | — | 5.00 | 7.01 | — | — | — | — |
| ZnO | 10.00 | 9.25 | 10.00 | 9.39 | 6.00 | 5.55 | 10.00 | 9.38 | 14.50 | 13.22 |
| CaO | 6.00 | 3.83 | 15.00 | 9.71 | 16.00 | 10.20 | 12.00 | 7.75 | 6.00 | 3.77 |
| MgO | 9.00 | 4.13 | 5.00 | 2.33 | 5.00 | 2.29 | 5.00 | 2.32 | — | — |
| $La_2O_3$ | 1.00 | 3.70 | 1.00 | 3.76 | 1.00 | 3.71 | 1.00 | 3.75 | 0.50 | 1.82 |
| Total | 100 | 100 | 100 | 100 | 100 | 100 | 100 | 100 | 100 | 100 |
| $TiO_2 + ZrO_2$ | 9.00 | 8.18 | 5.00 | 4.61 | 5.00 | 7.01 | 5.00 | 4.60 | 4.00 | 3.53 |
| RO | 50.00 | 60.80 | 54.00 | 63.90 | 51.00 | 59.90 | 51.00 | 61.86 | 46.50 | 61.64 |
| Softening point (Ts) (° C.) | 749 | | 747 | | 815 | | 758 | | 757 | |
| Peak crystallization temp (Tp) (° C.) | 851 | | 864 | | 1048 | | 893 | | 922 | |

TABLE 1-1-continued

| Composition | Example 1 mol % | wt % | Example 2 mol % | wt % | Example 3 mol % | wt % | Example 4 mol % | wt % | Example 5 mol % | wt % |
|---|---|---|---|---|---|---|---|---|---|---|
| Tp − Ts | 102 | | 117 | | 233 | | 135 | | 165 | |
| Thermal expansion coefficient (α) (50-850° C.) × 10⁻⁷/° C. | 122 | | 104 | | 112 | | 112 | | 114 | |
| Flow diameter (mm) | 17.1 | | 17.2 | | 17.1 | | 17.2 | | 17.2 | |
| Mean particle size D₅₀ (μm) | 2.7 | | 3.6 | | 3.2 | | 3.2 | | 2.6 | |

TABLE 1-2

| Composition | Example 6 mol % | wt % | Example 7 mol % | wt % | Example 8 mol % | wt % | Example 9 mol % | wt % |
|---|---|---|---|---|---|---|---|---|
| $SiO_2$ | 52.00 | 36.43 | 55.00 | 35.61 | 55.00 | 36.00 | 55.00 | 35.81 |
| BaO | 24.00 | 42.92 | 35.00 | 57.85 | 35.00 | 58.48 | 35.00 | 58.16 |
| $TiO_2$ | 3.00 | 2.80 | 1.00 | 0.86 | 1.00 | 0.87 | 1.00 | 0.87 |
| $ZrO_2$ | — | — | — | — | — | — | — | — |
| ZnO | 10.50 | 9.97 | 4.00 | 3.51 | — | — | 2.00 | 1.76 |
| CaO | 7.00 | 4.58 | — | — | 4.00 | 2.44 | 2.00 | 1.22 |
| MgO | 3.00 | 1.41 | 5.00 | 2.17 | 5.00 | 2.20 | 5.00 | 2.18 |
| $La_2O_3$ | 0.50 | 1.90 | — | — | — | — | — | — |
| Total | 100 | 100 | 100 | 100 | 100 | 100 | 100 | 100 |
| $TiO_2$ + $ZrO_2$ | 3.00 | 2.80 | 1.00 | 0.86 | 1.00 | 0.87 | 1.00 | 0.87 |
| RO | 44.50 | 58.88 | 44.00 | 63.53 | 44.00 | 63.12 | 44.00 | 63.32 |
| Softening point (Ts) (° C.) | 767 | | 747 | | 759 | | 759 | |
| Peak crystallization temp (Tp) (° C.) | 982 | | 829 | | 843 | | 839 | |
| Tp − Ts | 215 | | 82 | | 84 | | 80 | |
| Thermal expansion coefficient (α) (50-850° C.) × 10⁻⁷/° C. | 100 | | 138 | | 127 | | 132 | |
| Flow diameter (mm) | 17.7 | | 17.2 | | 17.2 | | 17.2 | |
| Mean particle size D₅₀ (μm) | 3.2 | | 3.5 | | 6.0 | | 4.6 | |

Examples 10-21

The respective compositions of the glass of Examples 10-21 and their physical properties are shown in Tables 2-1 to 2-3 below.

TABLE 2-1

| Composition | Example 10 mol % | wt % | Example 11 mol % | wt % | Example 12 mol % | wt % | Example 13 mol % | wt % |
|---|---|---|---|---|---|---|---|---|
| $SiO_2$ | 45.00 | 30.14 | 45.00 | 30.79 | 47.00 | 33.14 | 49.00 | 34.77 |
| BaO | 24.00 | 41.03 | 24.00 | 41.92 | 25.00 | 44.99 | 20.00 | 36.23 |
| $TiO_2$ | 5.00 | 4.45 | 9.00 | 8.19 | 5.00 | 4.69 | — | — |
| $ZrO_2$ | 5.00 | 6.87 | — | — | — | — | 5.00 | 7.28 |
| ZnO | 8.00 | 7.26 | 10.00 | 9.27 | 10.00 | 9.55 | 10.00 | 9.61 |
| CaO | 7.00 | 4.38 | 6.00 | 3.83 | 8.00 | 5.26 | 6.00 | 3.97 |
| MgO | 5.00 | 2.25 | 5.00 | 2.30 | 5.00 | 2.37 | 9.00 | 4.29 |
| $La_2O_3$ | 1.00 | 3.63 | 1.00 | 3.71 | — | — | 1.00 | 3.85 |
| Total | 100 | 100 | 100 | 100 | 100 | 100 | 100 | 100 |
| $TiO_2$ + $ZrO_2$ | 10.00 | 11.32 | 9.00 | 8.19 | 5.00 | 4.69 | 5.00 | 7.28 |
| RO | 44.00 | 54.92 | 45.00 | 57.32 | 48.00 | 62.17 | 45.00 | 54.10 |
| Softening point (Ts) (° C.) | 799 | | 765 | | 745 | | 802 | |
| Peak crystallization temp (Tp) (° C.) | 963 | | 883 | | 876 | | 970 | |
| Tp − Ts | 164 | | 118 | | 131 | | 168 | |

TABLE 2-1-continued

| Composition | Example 10 mol % | wt % | Example 11 mol % | wt % | Example 12 mol % | wt % | Example 13 mol % | wt % |
|---|---|---|---|---|---|---|---|---|
| Thermal expansion coefficient ($\alpha$) (50-850° C.) × $10^{-7}$/° C. | 118 | | 115 | | 104 | | 125 | |
| Flow diameter (mm) | 17.3 | | 17.1 | | 17.1 | | 17.0 | |
| Mean particle size $D_{50}$ (μm) | 2.8 | | 2.8 | | 3.5 | | 3.2 | |

TABLE 2-2

| Composition | Example 14 mol % | wt % | Example 15 mol % | wt % | Example 16 mol % | wt % | Example 17 mol % | wt % |
|---|---|---|---|---|---|---|---|---|
| $SiO_2$ | 49.00 | 35.22 | 49.00 | 36.13 | 49.00 | 35.69 | 49.00 | 35.81 |
| BaO | 20.00 | 36.70 | 20.00 | 37.64 | 20.00 | 37.18 | 22.00 | 41.04 |
| $TiO_2$ | 2.50 | 2.39 | 5.00 | 4.90 | 5.00 | 4.84 | 5.00 | 4.86 |
| $ZrO_2$ | 2.50 | 3.69 | — | — | — | — | — | — |
| ZnO | 10.00 | 9.74 | 6.00 | 5.99 | 10.00 | 9.87 | 6.50 | 6.44 |
| CaO | 6.00 | 4.03 | 10.00 | 6.88 | 6.00 | 4.08 | 8.00 | 5.46 |
| MgO | 9.00 | 4.34 | 9.00 | 4.45 | 9.00 | 4.40 | 9.00 | 4.41 |
| $La_2O_3$ | 1.00 | 3.90 | 1.00 | 4.00 | 1.00 | 3.95 | 0.50 | 1.98 |
| Total | 100 | 100 | 100 | 100 | 100 | 100 | 100 | 100 |
| $TiO_2 + ZrO_2$ | 5.00 | 6.08 | 5.00 | 4.90 | 5.00 | 4.84 | 5.00 | 4.86 |
| RO | 45.00 | 54.81 | 45.00 | 54.96 | 45.00 | 55.53 | 45.50 | 57.35 |
| Softening point (Ts) (° C.) | 788 | | 777 | | 768 | | 776 | |
| Peak crystallization temp (Tp) (° C.) | 960 | | 959 | | 941 | | 938 | |
| Tp − Ts | 172 | | 182 | | 173 | | 162 | |
| Thermal expansion coefficient ($\alpha$) (50-850° C.) × $10^{-7}$/° C. | 141 | | 108 | | 140 | | 130 | |
| Flow diameter (mm) | 17.1 | | 17.9 | | 17.3 | | 17.2 | |
| Mean particle size $D_{50}$ (μm) | 3.4 | | 3.6 | | 4.2 | | 3.4 | |

TABLE 2-3

| Composition | Example 18 mol % | wt % | Example 19 mol % | wt % | Example 20 mol % | wt % | Example 21 mol % | wt % |
|---|---|---|---|---|---|---|---|---|
| $SiO_2$ | 49.00 | 34.48 | 49.00 | 34.08 | 49.00 | 33.67 | 49.00 | 31.72 |
| BaO | 24.00 | 43.11 | 24.00 | 42.61 | 26.00 | 45.61 | 32.00 | 52.88 |
| $TiO_2$ | 5.00 | 4.68 | 5.00 | 4.62 | 5.00 | 4.57 | 3.00 | 2.58 |
| $ZrO_2$ | — | — | — | — | — | — | — | — |
| ZnO | 6.00 | 5.72 | 10.00 | 9.42 | 10.50 | 9.77 | 6.00 | 3.51 |
| CaO | 6.00 | 3.94 | 2.00 | 1.30 | 2.00 | 1.28 | 4.00 | 3.63 |
| MgO | 9.00 | 4.25 | 9.00 | 4.20 | 7.00 | 3.23 | 5.00 | 2.17 |
| $La_2O_3$ | 1.00 | 3.82 | 1.00 | 3.77 | 0.50 | 1.86 | 1.00 | 3.51 |
| Total | 100 | 100 | 100 | 100 | 100 | 100 | 100 | 100 |
| $TiO_2 + ZrO_2$ | 5.00 | 4.68 | 5.00 | 4.62 | 5.00 | 4.57 | 3.00 | 2.58 |
| RO | 45.00 | 57.02 | 45.00 | 57.53 | 45.50 | 59.89 | 47.00 | 62.19 |
| Softening point (Ts) (° C.) | 767 | | 763 | | 777 | | 763 | |
| Peak crystallization temp (Tp) (° C.) | 918 | | 904 | | 925 | | 865 | |
| Tp − Ts | 151 | | 141 | | 148 | | 102 | |
| Thermal expansion coefficient ($\alpha$) (50-850° C.) × $10^{-7}$/° C. | 134 | | 133 | | 128 | | 114 | |
| Flow diameter (mm) | 17.2 | | 17.1 | | 17.1 | | 17.1 | |
| Mean particle size $D_{50}$ (μm) | 3.2 | | 3.5 | | 2.0 | | 3.5 | |

Examples 22-38

The respective compositions of the glass of Examples 22-38 and their physical properties are shown in Tables 3-1 to 3-4 below.

TABLE 3-1

| Composition | Example 22 | | Example 23 | | Example 24 | | Example 25 | |
|---|---|---|---|---|---|---|---|---|
| | mol % | wt % | mol % | wt % | mol % | wt % | mol % | wt % |
| $SiO_2$ | 45.00 | 31.13 | 47.00 | 31.69 | 47.00 | 32.60 | 47.00 | 32.48 |
| BaO | 24.00 | 42.38 | 24.00 | 41.31 | 24.00 | 42.49 | 24.00 | 42.34 |
| $TiO_2$ | 5.00 | 4.60 | — | — | 5.00 | 4.61 | 5.00 | 4.60 |
| $ZrO_2$ | — | — | 5.00 | 6.91 | — | — | — | — |
| ZnO | 10.00 | 9.38 | 10.00 | 9.13 | 10.00 | 9.40 | 10.00 | 9.36 |
| CaO | 10.00 | 6.46 | 8.00 | 5.03 | 6.00 | 3.88 | 8.00 | 5.16 |
| MgO | 5.00 | 2.32 | 5.00 | 2.26 | 7.00 | 3.26 | 5.00 | 2.32 |
| $La_2O_3$ | 1.00 | 3.75 | 1.00 | 3.66 | 1.00 | 3.76 | 1.00 | 3.75 |
| Total | 100 | 100 | 100 | 100 | 100 | 100 | 100 | 100 |
| $TiO_2 + ZrO_2$ | 5.00 | 4.60 | 5.00 | 6.91 | 5.00 | 4.61 | 5.00 | 4.60 |
| RO | 49.00 | 60.54 | 47.00 | 57.73 | 47.00 | 59.03 | 47.00 | 59.18 |
| Softening point (Ts) (° C.) | 765 | | 805 | | 751 | | 770 | |
| Peak crystallization temp (Tp) (° C.) | 921 | | 971 | | 904 | | 916 | |
| Tp − Ts | 156 | | 166 | | 153 | | 146 | |
| Thermal expansion coefficient ($\alpha$) (50-850° C.) $\times 10^{-7}$/° C. | 125 | | 104 | | 129 | | 122 | |
| Flow diameter (mm) | 17.2 | | 17.2 | | 17.1 | | 17.2 | |
| Mean particle size $D_{50}$ (μm) | 2.6 | | 3.1 | | 2.6 | | 3.2 | |

TABLE 3-2

| Composition | Example 26 | | Example 27 | | Example 28 | | Example 29 | |
|---|---|---|---|---|---|---|---|---|
| | mol % | wt % | mol % | wt % | mol % | wt % | mol % | wt % |
| $SiO_2$ | 47.00 | 32.61 | 47.00 | 32.30 | 49.00 | 34.60 | 49.00 | 34.21 |
| BaO | 24.00 | 42.50 | 24.00 | 42.11 | 22.00 | 39.66 | 24.00 | 42.77 |
| $TiO_2$ | 7.00 | 6.46 | 7.00 | 6.40 | 5.00 | 4.70 | 1.00 | 0.93 |
| $ZrO_2$ | — | — | — | — | — | — | — | — |
| ZnO | 8.00 | 7.52 | 10.00 | 9.31 | 10.00 | 9.57 | 10.00 | 9.46 |
| CaO | 6.00 | 3.89 | 6.00 | 3.85 | 8.00 | 5.27 | 10.00 | 6.52 |
| MgO | 7.00 | 3.26 | 5.00 | 2.31 | 5.00 | 2.37 | 5.00 | 2.34 |
| $La_2O_3$ | 1.00 | 3.76 | 1.00 | 3.73 | 1.00 | 3.83 | 1.00 | 3.79 |
| Total | 100 | 100 | 100 | 100 | 100 | 100 | 100 | 100 |
| $TiO_2 + ZrO_2$ | 7.00 | 6.46 | 7.00 | 6.40 | 5.00 | 4.70 | 1.00 | 0.93 |
| RO | 45.00 | 57.17 | 45.00 | 57.58 | 45.00 | 56.87 | 49.00 | 61.09 |
| Softening point (Ts) (° C.) | 756 | | 757 | | 778 | | 754 | |
| Peak crystallization temp (Tp) (° C.) | 900 | | 901 | | 896 | | 935 | |
| Tp − Ts | 144 | | 144 | | 118 | | 181 | |
| Thermal expansion coefficient ($\alpha$) (50-850° C.) $\times 10^{-7}$/° C. | 124 | | 97 | | 94 | | 145 | |
| Flow diameter (mm) | 17.0 | | 17.1 | | 17.2 | | 17.4 | |
| Mean particle size $D_{50}$ (μm) | 2.7 | | 2.9 | | 3.1 | | 4.4 | |

TABLE 3-3

| Composition | Example 30 | | Example 31 | | Example 32 | | Example 33 | |
|---|---|---|---|---|---|---|---|---|
| | mol % | wt % | mol % | wt % | mol % | wt % | mol % | wt % |
| $SiO_2$ | 49.00 | 34.36 | 49.00 | 34.15 | 49.00 | 34.03 | 49.00 | 33.83 |
| BaO | 24.00 | 42.95 | 24.00 | 42.70 | 24.00 | 42.54 | 24.00 | 42.30 |
| $TiO_2$ | 5.00 | 4.66 | 5.00 | 4.63 | 5.00 | 4.62 | 5.00 | 4.59 |

TABLE 3-3-continued

|  | Example 30 | | Example 31 | | Example 32 | | Example 33 | |
| --- | --- | --- | --- | --- | --- | --- | --- | --- |
| Composition | mol % | wt % | mol % | wt % | mol % | wt % | mol % | wt % |
| $ZrO_2$ | — | — | — | — | — | — | — | — |
| ZnO | 6.00 | 5.70 | 8.00 | 7.55 | 8.00 | 7.53 | 10.00 | 9.35 |
| CaO | 8.00 | 5.24 | 6.00 | 3.90 | 8.00 | 5.19 | 6.00 | 3.87 |
| MgO | 7.00 | 3.29 | 7.00 | 3.27 | 5.00 | 2.33 | 5.00 | 2.32 |
| $La_2O_3$ | 1.00 | 3.80 | 1.00 | 3.78 | 1.00 | 3.77 | 1.00 | 3.74 |
| Total | 100 | 100 | 100 | 100 | 100 | 100 | 100 | 100 |
| $TiO_2 + ZrO_2$ | 5.00 | 4.66 | 5.00 | 4.63 | 5.00 | 4.62 | 5.00 | 4.59 |
| RO | 45.00 | 57.18 | 45.00 | 57.42 | 45.00 | 57.59 | 45.00 | 57.84 |
| Softening point (Ts) (° C.) | 770 | | 783 | | 775 | | 775 | |
| Peak crystallization temp (Tp) (° C.) | 933 | | 951 | | 943 | | 939 | |
| Tp − Ts | 163 | | 168 | | 168 | | 164 | |
| Thermal expansion coefficient ($\alpha$) (50-850° C.) $\times 10^{-7}$/° C. | 99 | | 97 | | 95 | | 119 | |
| Flow diameter (mm) | 17.2 | | 17.1 | | 17.2 | | 17.2 | |
| Mean particle size $D_{50}$ (μm) | 3.4 | | 3.1 | | 3.6 | | 3.1 | |

TABLE 3-4

|  | Example 34 | | Example 35 | | Example 36 | | Example 37 | | Example 38 | |
| --- | --- | --- | --- | --- | --- | --- | --- | --- | --- | --- |
| Composition | mol % | wt % | mol % | wt % | mol % | wt % | mol % | wt % | mol % | wt % |
| $SiO_2$ | 49.00 | 33.51 | 49.00 | 32.79 | 49.00 | 33.59 | 49.00 | 32.97 | 49.00 | 32.22 |
| BaO | 24.00 | 41.90 | 26.00 | 44.41 | 26.00 | 45.50 | 26.00 | 44.66 | 30.00 | 50.36 |
| $TiO_2$ | 5.00 | 4.55 | — | — | 5.00 | 4.56 | 5.00 | 4.47 | 3.00 | 2.62 |
| $ZrO_2$ | — | — | 3.00 | 4.12 | — | — | — | — | — | — |
| ZnO | 12.00 | 11.12 | 10.00 | 9.06 | 6.00 | 5.57 | 10.00 | 9.12 | 6.00 | 5.34 |
| CaO | 6.00 | 3.83 | 6.00 | 3.75 | 6.00 | 3.84 | 6.00 | 3.77 | 6.00 | 3.68 |
| MgO | 3.00 | 1.38 | 5.00 | 2.25 | 7.00 | 3.22 | 3.00 | 1.35 | 5.00 | 2.21 |
| $La_2O_3$ | 1.00 | 3.71 | 1.00 | 3.63 | 1.00 | 3.72 | 3.00 | 3.65 | 1.00 | 3.57 |
| Total | 100 | 100 | 100 | 100 | 100 | 100 | 100 | 100 | 100 | 100 |
| $TiO_2 + ZrO_2$ | 5.00 | 4.55 | 3.00 | 4.12 | 5.00 | 4.56 | 5.00 | 4.47 | 3.00 | 2.62 |
| RO | 45.00 | 58.23 | 47.00 | 59.47 | 45.00 | 58.13 | 45.00 | 58.90 | 47.00 | 61.59 |
| Softening point (Ts) (° C.) | 764 | | 790 | | 779 | | 767 | | 769 | |
| Peak crystallization temp (Tp) (° C.) | 950 | | 981 | | 929 | | 948 | | 946 | |
| Tp − Ts | 186 | | 191 | | 150 | | 181 | | 177 | |
| Thermal expansion coefficient ($\alpha$) (50-850° C.) $\times 10^{-7}$/° C. | 108 | | 109 | | 106 | | 107 | | 122 | |
| Flow diameter (mm) | 17.2 | | 17.2 | | 17.2 | | 17.1 | | 17.2 | |
| Mean particle size $D_{50}$ (μm) | 3.0 | | 3.6 | | 3.4 | | 3.4 | | 4.7 | |

Examples 39-46

The respective compositions of glass of Examples 39-46 and their physical properties are shown in Tables 4-1 and 4-2 below.

TABLE 4-1

|  | Example 39 | | Example 40 | | Example 41 | | Example 42 | |
| --- | --- | --- | --- | --- | --- | --- | --- | --- |
| Composition | mol % | wt % | mol % | wt % | mol % | wt % | mol % | wt % |
| $SiO_2$ | 47.00 | 32.39 | 49.00 | 34.41 | 49.00 | 34.34 | 49.00 | 34.38 |
| BaO | 26.00 | 45.73 | 24.00 | 43.02 | 24.00 | 42.94 | 24.00 | 42.99 |
| $TiO_2$ | 3.00 | 2.75 | 3.00 | 2.80 | 5.00 | 4.66 | 5.00 | 4.67 |
| $ZrO_2$ | — | — | — | — | — | — | — | — |
| ZnO | 10.50 | 9.80 | 10.40 | 9.89 | 10.40 | 9.87 | 10.70 | 10.17 |
| CaO | 8.00 | 5.15 | 8.00 | 5.24 | 4.00 | 2.62 | 8.00 | 5.24 |

TABLE 4-1-continued

|  | Example 39 | | Example 40 | | Example 41 | | Example 42 | |
| --- | --- | --- | --- | --- | --- | --- | --- | --- |
| Composition | mol % | wt % | mol % | wt % | mol % | wt % | mol % | wt % |
| MgO | 5.00 | 2.31 | 5.00 | 2.36 | 7.00 | 3.29 | 3.00 | 1.41 |
| $La_2O_3$ | 0.50 | 1.87 | 0.60 | 2.28 | 0.60 | 2.28 | 0.30 | 1.14 |
| Total | 100 | 100 | 100 | 100 | 100 | 100 | 100 | 100 |
| $TiO_2 + ZrO_2$ | 3.00 | 2.75 | 3.00 | 2.80 | 5.00 | 4.66 | 5.00 | 4.67 |
| RO | 49.50 | 62.99 | 47.40 | 60.51 | 45.40 | 58.72 | 45.70 | 59.81 |
| Softening point (Ts) (° C.) | 769 | | 756 | | 757 | | 766 | |
| Peak crystallization temp (Tp) (° C.) | 944 | | 943 | | 913 | | 932 | |
| Thermal expansion coefficient (α) (50-850° C.) × $10^{-7}$/° C. | 120 | | 119 | | 121 | | 109 | |
| Flow diameter (mm) | 17.2 | | 17.2 | | 17.2 | | 17.4 | |
| Mean particle size $D_{50}$ (μm) | 4.4 | | 4.5 | | 2.9 | | 8.1 | |

TABLE 4-2

|  | Example 43 | | Example 44 | | Example 45 | | Example 46 | |
| --- | --- | --- | --- | --- | --- | --- | --- | --- |
| Composition | mol % | wt % | mol % | wt % | mol % | wt % | mol % | wt % |
| $SiO_2$ | 49.00 | 33.46 | 49.00 | 33.60 | 49.00 | 33.05 | 49.00 | 32.19 |
| BaO | 26.00 | 45.32 | 26.50 | 46.38 | 28.50 | 49.07 | 28.50 | 47.80 |
| $TiO_2$ | 1.00 | 0.91 | 3.00 | 2.71 | 3.00 | 2.69 | 3.00 | 2.62 |
| $ZrO_2$ | — | — | — | — | — | — | — | — |
| ZnO | 14.00 | 12.95 | 10.00 | 9.29 | 8.00 | 7.31 | 8.00 | 7.12 |
| CaO | 6.50 | 4.14 | 6.00 | 3.84 | 6.00 | 3.78 | 1.00 | 0.61 |
| MgO | 3.00 | 1.37 | 5.00 | 2.30 | 5.00 | 2.26 | 5.00 | 2.20 |
| SrO | — | — | — | — | — | — | 5.00 | 5.67 |
| $La_2O_3$ | 0.50 | 1.85 | 0.50 | 1.86 | 0.50 | 1.83 | 0.50 | 1.78 |
| Total | 100 | 100 | 100 | 100 | 100 | 100 | 100 | 100 |
| $TiO_2 + ZrO_2$ | 1.00 | 0.91 | 3.00 | 2.71 | 3.00 | 2.69 | 3.00 | 2.62 |
| RO | 49.50 | 63.78 | 47.50 | 61.81 | 47.50 | 62.42 | 47.50 | 57.73 |
| Softening point (Ts) (° C.) | 762 | | 758 | | 765 | | 743 | |
| Peak crystallization temp (Tp) (° C.) | 956 | | 929 | | not detected | | not detected | |
| Tp − Ts | 194 | | 171 | | — | | — | |
| Thermal expansion coefficient (α) (50-850° C.) × $10^{-7}$/° C. | 134 | | 128 | | 130 | | 128 | |
| Flow diameter (mm) | 17.1 | | 17.2 | | 17.2 | | 17.2 | |
| Mean particle size $D_{50}$ (μm) | 2.7 | | 4.8 | | 2.4 | | 2.6 | |

Examples 47 and 48

The compositions and properties of Examples 47 and 48 containing a filler are shown in Table 5 below.

TABLE 5

|  | Example 47 | Example 48 |
| --- | --- | --- |
| Glass/Filler (wt %) | 90   10 | 90   10 |
| Glass | Example 41 | Example 43 |
| Filler | Barium titanate | Barium titanate |
| Thermal expansion coefficient (α) (50-850° C.) × $10^{-7}$/° C. | 116 | 130 |
| Flow diameter (mm) | 17.3 | 17.2 |

Comparative Examples 1 and 2

The respective compositions of the glass of Comparative Examples 1 and 2 are shown in Table 6 below.

TABLE 6

|  | Comparative example 1 | | Comparative example 2 | |
| --- | --- | --- | --- | --- |
| Composition | mol % | wt % | mol % | wt % |
| $SiO_2$ | 56.00 | 45.52 | 40.00 | 32.16 |
| BaO | 10.00 | 20.75 | 15.00 | 30.78 |
| $TiO_2$ | 4.00 | 4.32 | — | — |
| $ZrO_2$ | — | — | — | — |
| ZnO | 10.00 | 11.01 | 10.00 | 10.89 |
| CaO | 15.00 | 11.38 | 15.00 | 11.26 |
| MgO | — | — | 15.00 | 8.09 |
| SrO | 5.00 | 7.01 | — | — |

TABLE 6-continued

|  | Comparative example 1 | | Comparative example 2 | |
|---|---|---|---|---|
| Composition | mol % | wt % | mol % | wt % |
| $La_2O_3$ | — | — | — | — |
| $Al_2O_3$ | — | — | 5.00 | 6.82 |
| Total | 100 | 100 | 100 | 100 |
| $TiO_2 + ZrO_2$ | 4.00 | 4.32 | — | — |
| RO | 40 | 50.15 | 55 | 61.02 |
| Softening point (Ts) (° C.) | 772 | | 758 | |
| Peak crystallization temp (Tp) (° C.) | not detected | | 875 | |
| Tp − Ts | — | | 117 | |
| Thermal expansion coefficient (α) (50-850° C.) × $10^{-7}$/° C. | 103 | | 122 | |
| Flow diameter (mm) | 18.0 | | 16.8 | |
| Mean particle size $D_{50}$ (μm) | 3.7 | | 5.3 | |

As seen in the above tables, the glass of Examples 1-46 exhibited advantageous physical properties meeting the purpose of the present invention, and the glass powders containing a filler also exhibited physical properties comparable to those with the plain glass powders of the Examples. In contrast, crystallization by firing did not occur with the glass of Comparative Example 1, and only an insufficient flow diameter was achieved with the glass of Comparative Example 2.

Example 49-95

Then, the glass of Example 49-95 were produced and tested in the same manner as in the Examples above. The compositions and physical properties of the glass are shown in Tables 7-1 to 7-10 below. The glass of these Examples exhibited physical properties as advantageous as those of the aforementioned Examples.

TABLE 7-1

|  | Example 49 | | Example 50 | | Example 51 | | Example 52 | | Example 53 | |
|---|---|---|---|---|---|---|---|---|---|---|
| Composition | mol % | wt % | mol % | wt % | mol % | wt % | mol % | wt % | mol % | wt % |
| $SiO_2$ | 46.00 | 32.13 | 46.00 | 32.06 | 46.00 | 32.14 | 46.00 | 32.00 | 46.50 | 32.52 |
| BaO | 24.50 | 43.69 | 24.50 | 43.58 | 24.50 | 43.69 | 25.00 | 44.39 | 24.50 | 43.74 |
| $TiO_2$ | 4.00 | 3.72 | 4.00 | 3.71 | 4.50 | 4.18 | 4.00 | 3.70 | 4.00 | 3.72 |
| $ZrO_2$ | — | — | 0.50 | 0.71 | — | — | — | — | — | — |
| ZnO | 10.50 | 9.94 | 10.00 | 9.44 | 10.00 | 9.46 | 10.00 | 9.42 | 10.00 | 9.48 |
| CaO | 10.00 | 6.52 | 10.00 | 6.50 | 10.00 | 6.52 | 10.00 | 6.49 | 10.00 | 6.53 |
| MgO | 4.50 | 2.11 | 4.50 | 2.10 | 4.50 | 2.11 | 4.50 | 2.10 | 4.50 | 2.11 |
| $La_2O_3$ | 0.50 | 1.89 | 0.50 | 1.89 | 0.50 | 1.89 | 0.50 | 1.89 | 0.50 | 1.90 |
| $Yb_2O_3$ | — | — | — | — | — | — | — | — | — | — |
| $CeO_2$ | — | — | — | — | — | — | — | — | — | — |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 4.0 | 3.7 | 4.5 | 4.4 | 4.5 | 4.2 | 4.0 | 3.7 | 4.0 | 3.7 |
| RO | 49.5 | 62.3 | 49.0 | 61.6 | 49.0 | 61.8 | 49.5 | 62.4 | 49.0 | 61.9 |
| Softening point (Ts) (° C.) | 799 | | 783 | | 780 | | 814 | | 790 | |
| Peak crystallization temp (Tp) (° C.) | 913 | | 929 | | 914 | | 909 | | 922 | |
| Tp − Ts | 114 | | 146 | | 134 | | 95 | | 132 | |
| Thermal expansion coefficient (α) (50-850° C.) × $10^{-7}$/° C. | 120 | | 124 | | 122 | | 123 | | 120 | |
| Flow diameter (mm) | 17.4 | | 17.3 | | 17.3 | | 17.2 | | 17.3 | |
| Mean particle size $D_{50}$ (μm) | 4.4 | | 4.0 | | 4.3 | | 5.0 | | 3.4 | |

TABLE 7-2

|  | Example 54 | | Example 55 | | Example 56 | | Example 57 | | Example 58 | |
|---|---|---|---|---|---|---|---|---|---|---|
| Composition | mol % | wt % | mol % | wt % | mol % | wt % | mol % | wt % | mol % | wt % |
| $SiO_2$ | 48.50 | 32.45 | 49.00 | 33.07 | 49.00 | 31.99 | 49.00 | 32.82 | 49.00 | 32.40 |
| BaO | 28.50 | 48.67 | 27.00 | 46.51 | 28.50 | 47.49 | 28.50 | 48.73 | 28.50 | 48.10 |
| $TiO_2$ | 3.00 | 2.67 | 3.00 | 2.69 | — | — | 2.50 | 2.23 | 2.50 | 2.20 |
| $ZrO_2$ | 1.00 | 1.37 | 2.00 | 2.77 | 6.50 | 8.70 | 1.00 | 1.37 | 3.50 | 4.75 |
| ZnO | 8.00 | 7.25 | 8.00 | 7.31 | 5.00 | 4.42 | 8.00 | 7.26 | 6.00 | 5.37 |
| CaO | 6.00 | 3.75 | 6.00 | 3.78 | 6.00 | 3.66 | 6.00 | 3.75 | 5.50 | 3.39 |
| MgO | 4.50 | 2.02 | 4.50 | 2.04 | 4.50 | 1.97 | 4.50 | 2.02 | 4.50 | 2.00 |
| $La_2O_3$ | 0.50 | 1.81 | 0.50 | 1.83 | 0.50 | 1.77 | 0.50 | 1.82 | 0.50 | 1.79 |
| $Yb_2O_3$ | — | — | — | — | — | — | — | — | — | — |
| $CeO_2$ | — | — | — | — | — | — | — | — | — | — |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |

TABLE 7-2-continued

| Composition | Example 54 mol % | wt % | Example 55 mol % | wt % | Example 56 mol % | wt % | Example 57 mol % | wt % | Example 58 mol % | wt % |
|---|---|---|---|---|---|---|---|---|---|---|
| $TiO_2 + ZrO_2$ | 4.0 | 4.0 | 5.0 | 5.5 | 6.5 | 8.7 | 3.5 | 3.6 | 6.0 | 7.0 |
| RO | 47.0 | 61.7 | 45.5 | 59.6 | 44.0 | 57.5 | 47.0 | 61.8 | 44.5 | 58.9 |
| Softening point (Ts) (° C.) | 782 | | 809 | | 839 | | 779 | | 808 | |
| Peak crystallization temp (Tp) (° C.) | 923 | | 971 | | not detected | | 957 | | 990 | |
| Tp − Ts | 141 | | 162 | | — | | 178 | | 182 | |
| Thermal expansion coefficient (α) (50-850° C.) × $10^{-7}$/° C. | 131 | | 132 | | 98 | | 123 | | 124 | |
| Flow diameter (mm) | 17.3 | | 17.4 | | 17 | | 17.5 | | 17.4 | |
| Mean particle size $D_{50}$ (μm) | 5.0 | | 3.4 | | 5.8 | | 4.6 | | 3.3 | |

TABLE 7-3

| Composition | Example 59 mol % | wt % | Example 60 mol % | wt % | Example 61 mol % | wt % | Example 62 mol % | wt % | Example 63 mol % | wt % |
|---|---|---|---|---|---|---|---|---|---|---|
| $SiO_2$ | 49.00 | 32.22 | 49.00 | 32.98 | 49.00 | 32.90 | 49.00 | 32.78 | 49.00 | 33.28 |
| BaO | 28.50 | 47.83 | 28.50 | 48.96 | 28.50 | 48.85 | 28.50 | 48.66 | 28.50 | 49.41 |
| $TiO_2$ | 2.50 | 2.19 | 3.00 | 2.69 | 3.00 | 2.68 | 3.00 | 2.67 | 3.00 | 2.71 |
| $ZrO_2$ | 3.50 | 4.72 | — | — | 0.50 | 0.69 | 1.00 | 1.37 | 1.00 | 1.39 |
| ZnO | 8.00 | 7.13 | 8.50 | 7.75 | 8.00 | 7.28 | 8.00 | 7.25 | 8.00 | 7.36 |
| CaO | 3.50 | 2.15 | 6.00 | 3.77 | 6.00 | 3.76 | 5.50 | 3.43 | 6.00 | 3.80 |
| MgO | 4.50 | 1.99 | 4.50 | 2.03 | 4.50 | 2.03 | 4.50 | 2.02 | 4.50 | 2.05 |
| $La_2O_3$ | 0.50 | 1.78 | 0.50 | 1.82 | 0.50 | 1.82 | 0.50 | 1.81 | — | — |
| $Yb_2O_3$ | — | — | — | — | — | — | — | — | — | — |
| $CeO_2$ | — | — | — | — | — | — | — | — | — | — |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 6.0 | 6.9 | 3.0 | 2.7 | 3.5 | 3.4 | 4.0 | 4.0 | 4.0 | 4.1 |
| RO | 44.5 | 59.1 | 47.5 | 62.5 | 47.0 | 61.9 | 46.5 | 61.4 | 47.0 | 62.6 |
| Softening point (Ts) (° C.) | 797 | | 755 | | 770 | | 767 | | 776 | |
| Peak crystallization temp (Tp) (° C.) | 997 | | not detected | | not detected | | 949 | | 937 | |
| Tp − Ts | 200 | | — | | — | | 182 | | 161 | |
| Thermal expansion coefficient (α) (50-850° C.) × $10^{-7}$/° C. | 126 | | 114 | | 130 | | 132 | | 130 | |
| Flow diameter (mm) | 17.4 | | 17.2 | | 17.4 | | 17.5 | | 17.3 | |
| Mean particle size $D_{50}$ (μm) | 3.6 | | 2.7 | | 4.7 | | 3.2 | | 3.2 | |

TABLE 7-4

| Composition | Example 64 mol % | wt % | Example 65 mol % | wt % | Example 66 mol % | wt % | Example 67 mol % | wt % | Example 68 mol % | wt % |
|---|---|---|---|---|---|---|---|---|---|---|
| $SiO_2$ | 49.00 | 32.66 | 49.00 | 32.60 | 49.00 | 32.41 | 49.00 | 32.45 | 49.00 | 32.18 |
| BaO | 28.50 | 48.48 | 28.50 | 48.39 | 28.50 | 48.12 | 28.50 | 48.17 | 28.50 | 47.77 |
| $TiO_2$ | 3.00 | 2.66 | 3.00 | 2.65 | 3.00 | 2.64 | 3.00 | 2.64 | 3.00 | 2.62 |
| $ZrO_2$ | 1.50 | 2.05 | 2.50 | 3.41 | 2.50 | 3.39 | 3.50 | 4.75 | 3.50 | 4.71 |
| ZnO | 8.00 | 7.22 | 6.00 | 5.41 | 8.00 | 7.17 | 5.00 | 4.49 | 8.00 | 7.12 |
| CaO | 5.00 | 3.11 | 6.00 | 3.73 | 4.00 | 2.47 | 6.00 | 3.71 | 3.00 | 1.84 |
| MgO | 4.50 | 2.01 | 4.50 | 2.01 | 4.50 | 2.00 | 4.50 | 2.00 | 4.50 | 1.98 |
| $La_2O_3$ | 0.50 | 1.81 | 0.50 | 1.80 | 0.50 | 1.79 | 0.50 | 1.80 | 0.50 | 1.78 |
| $Yb_2O_3$ | — | — | — | — | — | — | — | — | — | — |
| $CeO_2$ | — | — | — | — | — | — | — | — | — | — |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 4.5 | 4.7 | 5.5 | 6.1 | 5.5 | 6.0 | 6.5 | 7.4 | 6.5 | 7.3 |

TABLE 7-4-continued

| Composition | Example 64 | | Example 65 | | Example 66 | | Example 67 | | Example 68 | |
|---|---|---|---|---|---|---|---|---|---|---|
| | mol % | wt % | mol % | wt % | mol % | wt % | mol % | wt % | mol % | wt % |
| RO | 46.0 | 60.8 | 45.0 | 59.5 | 45.0 | 59.8 | 44.0 | 58.4 | 44.0 | 58.7 |
| Softening point (Ts) (° C.) | 778 | | 793 | | 807 | | 796 | | 796 | |
| Peak crystallization temp (Tp) (° C.) | 957 | | 951 | | 958 | | 971 | | 964 | |
| Tp − Ts | 179 | | 158 | | 151 | | 175 | | 168 | |
| Thermal expansion coefficient (α) (50-850° C.) × $10^{-7}$/° C. | 131 | | 126 | | 129 | | 126 | | 123 | |
| Flow diameter (mm) | 17.3 | | 17.3 | | 17.3 | | 17.3 | | 17.3 | |
| Mean particle size $D_{50}$ (μm) | 4.2 | | 5.5 | | 3.2 | | 2.7 | | 2.8 | |

TABLE 7-5

| Composition | Example 69 | | Example 70 | | Example 71 | | Example 72 | | Example 73 | |
|---|---|---|---|---|---|---|---|---|---|---|
| | mol % | wt % | mol % | wt % | mol % | wt % | mol % | wt % | mol % | wt % |
| $SiO_2$ | 49.00 | 32.98 | 49.00 | 32.05 | 49.00 | 31.78 | 49.50 | 33.35 | 49.00 | 32.33 |
| BaO | 28.50 | 48.97 | 29.50 | 49.25 | 29.50 | 48.84 | 28.50 | 49.02 | 28.50 | 48.00 |
| $TiO_2$ | 3.50 | 3.13 | 3.00 | 2.61 | 3.00 | 2.59 | 3.00 | 2.69 | 2.50 | 2.19 |
| $ZrO_2$ | — | — | 3.50 | 4.69 | 3.50 | 4.66 | — | — | 0.50 | 0.68 |
| ZnO | 8.00 | 7.29 | 5.00 | 4.43 | 8.00 | 7.03 | 8.00 | 7.30 | 8.00 | 7.15 |
| CaO | 6.00 | 3.77 | 6.00 | 3.66 | 3.00 | 1.82 | 6.00 | 3.77 | 6.00 | 3.70 |
| MgO | 4.50 | 2.03 | 3.50 | 1.54 | 3.50 | 1.52 | 4.50 | 2.03 | 4.50 | 1.99 |
| $La_2O_3$ | 0.50 | 1.85 | 0.50 | 1.77 | 0.50 | 1.76 | 0.50 | 1.83 | 0.50 | 1.79 |
| $Yb_2O_3$ | — | — | — | — | — | — | — | — | 0.50 | 2.16 |
| $CeO_2$ | — | — | — | — | — | — | — | — | — | — |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 3.5 | 3.1 | 6.5 | 7.3 | 6.5 | 7.3 | 3.0 | 2.7 | 3.0 | 2.9 |
| RO | 47.0 | 62.1 | 44.0 | 58.9 | 44.0 | 59.2 | 47.0 | 62.1 | 47.0 | 60.8 |
| Softening point (Ts) (° C.) | 777 | | 799 | | 800 | | 772 | | 752 | |
| Peak crystallization temp (Tp) (° C.) | not detected | | not detected | | not detected | | not detected | | not detected | |
| Tp − Ts | — | | — | | — | | — | | — | |
| Thermal expansion coefficient (α) (50-850° C.) × $10^{-7}$/° C. | 113 | | 104 | | 108 | | 129 | | 124 | |
| Flow diameter (mm) | 17.2 | | 17.3 | | 17.4 | | 17.1 | | 17.3 | |
| Mean particle size $D_{50}$ (μm) | 4.6 | | 3.1 | | 5.0 | | 4.1 | | 4.0 | |

TABLE 7-6

| Composition | Example 74 | | Example 75 | | Example 76 | | Example 77 | | Example 78 | |
|---|---|---|---|---|---|---|---|---|---|---|
| | mol % | wt % | mol % | wt % | mol % | wt % | mol % | wt % | mol % | wt % |
| $SiO_2$ | 49.00 | 32.41 | 49.00 | 32.78 | 46.00 | 31.56 | 49.00 | 32.65 | 49.00 | 32.73 |
| BaO | 28.50 | 48.12 | 28.50 | 48.66 | 24.50 | 42.91 | 28.50 | 48.48 | 28.50 | 48.60 |
| $TiO_2$ | 3.00 | 2.64 | 3.00 | 2.67 | 4.00 | 3.65 | 2.00 | 1.77 | 2.50 | 2.22 |
| $ZrO_2$ | — | — | 0.50 | 0.69 | — | — | 1.00 | 1.37 | 0.50 | 0.69 |
| ZnO | 8.00 | 7.17 | 8.00 | 7.25 | 10.00 | 9.29 | 8.00 | 7.22 | 8.00 | 7.24 |
| CaO | 6.00 | 3.70 | 6.00 | 3.75 | 10.00 | 6.40 | 6.00 | 3.73 | 6.00 | 3.74 |
| MgO | 4.50 | 2.00 | 4.50 | 2.02 | 4.50 | 2.07 | 4.50 | 2.01 | 4.50 | 2.02 |
| $La_2O_3$ | 0.50 | 1.79 | — | — | 0.50 | 1.86 | 0.50 | 1.81 | 0.50 | 1.81 |
| $Yb_2O_3$ | 0.50 | 2.17 | 0.50 | 2.19 | 0.50 | 2.25 | — | — | — | — |
| $CeO_2$ | — | — | — | — | — | — | 0.50 | 0.95 | 0.50 | 0.96 |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 3.0 | 2.6 | 3.5 | 3.4 | 4.0 | 3.7 | 3.0 | 3.1 | 3.0 | 2.9 |
| RO | 47.0 | 61.0 | 47.0 | 61.7 | 49.0 | 60.7 | 47.0 | 61.4 | 47.0 | 61.6 |

TABLE 7-6-continued

| Composition | Example 74 | | Example 75 | | Example 76 | | Example 77 | | Example 78 | |
|---|---|---|---|---|---|---|---|---|---|---|
| | mol % | wt % | mol % | wt % | mol % | wt % | mol % | wt % | mol % | wt % |
| Softening point (Ts) (° C.) | 765 | | 768 | | 766 | | 766 | | 775 | |
| Peak crystallization temp (Tp) (° C.) | 947 | | not detected | | 931 | | not detected | | 978 | |
| Tp − Ts | 182 | | — | | 165 | | — | | 203 | |
| Thermal expansion coefficient ($\alpha$) (50-850° C.) × $10^{-7}$/° C. | 125 | | 131 | | 127 | | 137 | | 134 | |
| Flow diameter (mm) | 17.4 | | 17.5 | | 17.2 | | 17.6 | | 17.3 | |
| Mean particle size $D_{50}$ (μm) | 5.4 | | 3.6 | | 5.1 | | 3.8 | | 3.2 | |

TABLE 7-7

| Composition | Example 79 | | Example 80 | | Example 81 | | Example 82 | | Example 83 | |
|---|---|---|---|---|---|---|---|---|---|---|
| | mol % | wt % | mol % | wt % | mol % | wt % | mol % | wt % | mol % | wt % |
| $SiO_2$ | 49.00 | 32.81 | 46.00 | 31.97 | 50.00 | 33.75 | 50.00 | 33.48 | 50.00 | 33.39 |
| BaO | 28.50 | 48.71 | 24.50 | 43.46 | 27.50 | 47.38 | 28.50 | 48.71 | 28.50 | 48.57 |
| $TiO_2$ | 3.00 | 2.67 | 4.00 | 3.70 | 2.50 | 2.24 | 2.50 | 2.23 | 2.50 | 2.22 |
| $ZrO_2$ | — | — | — | — | 0.50 | 0.69 | 0.50 | 0.69 | 0.50 | 0.68 |
| ZnO | 8.00 | 7.26 | 10.00 | 8.41 | 8.00 | 7.32 | 7.00 | 6.35 | 8.00 | 7.24 |
| CaO | 6.00 | 3.75 | 10.00 | 6.49 | 6.00 | 3.78 | 6.00 | 3.75 | 5.00 | 3.12 |
| MgO | 4.50 | 2.02 | 4.50 | 2.10 | 4.50 | 2.04 | 4.50 | 2.02 | 4.50 | 2.02 |
| $La_2O_3$ | 0.50 | 1.82 | 0.50 | 1.88 | 0.50 | 1.83 | 0.50 | 1.82 | 0.50 | 1.81 |
| $Yb_2O_3$ | — | — | — | — | — | — | — | — | — | — |
| $CeO_2$ | 0.50 | 0.96 | 0.50 | 1.00 | 0.50 | 0.97 | 0.50 | 0.96 | 0.50 | 0.96 |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 3.0 | 2.7 | 4.0 | 3.7 | 3.0 | 2.9 | 3.0 | 2.9 | 3.0 | 2.9 |
| RO | 47.0 | 61.7 | 48.0 | 61.5 | 46.0 | 60.5 | 46.0 | 60.8 | 46.0 | 61.0 |
| Softening point (Ts) (° C.) | 770 | | 788 | | 802 | | 768 | | 763 | |
| Peak crystallization temp (Tp) (° C.) | 950 | | 928 | | not detected | | 963 | | 954 | |
| Tp − Ts | 180 | | 140 | | — | | 195 | | 191 | |
| Thermal expansion coefficient ($\alpha$) (50-850° C.) × $10^{-7}$/° C. | 132 | | 112 | | 117 | | 131 | | 132 | |
| Flow diameter (mm) | 17.3 | | 17.2 | | 17.3 | | 17.3 | | 17.3 | |
| Mean particle size $D_{50}$ (μm) | 4.1 | | 4.9 | | 4.7 | | 3.8 | | 4.3 | |

TABLE 7-8

| Composition | Example 84 | | Example 85 | | Example 86 | | Example 87 | | Example 88 | |
|---|---|---|---|---|---|---|---|---|---|---|
| | mol % | wt % | mol % | wt % | mol % | wt % | mol % | wt % | mol % | wt % |
| $SiO_2$ | 49.00 | 33.09 | 46.00 | 31.87 | 49.00 | 32.90 | 49.00 | 32.51 | 49.00 | 32.99 |
| BaO | 28.50 | 49.12 | 24.50 | 43.32 | 28.50 | 48.53 | 28.50 | 48.27 | 28.50 | 48.99 |
| $TiO_2$ | 3.00 | 2.69 | 4.00 | 3.69 | 3.00 | 2.66 | 2.50 | 2.21 | 3.00 | 2.69 |
| $ZrO_2$ | 0.50 | 0.69 | — | — | — | — | 0.50 | 0.68 | — | — |
| ZnO | 8.00 | 7.32 | 10.00 | 9.38 | 8.00 | 7.23 | 8.00 | 7.19 | 8.00 | 7.30 |
| CaO | 6.00 | 3.78 | 10.00 | 6.47 | 6.00 | 3.74 | 6.00 | 3.72 | 6.00 | 3.77 |
| MgO | 4.50 | 2.04 | 4.50 | 2.09 | 4.50 | 2.01 | 4.50 | 2.00 | 4.50 | 2.03 |
| $La_2O_3$ | — | — | 0.50 | 1.88 | — | — | — | — | — | — |
| $Yb_2O_3$ | — | — | — | — | 0.50 | 2.10 | 0.50 | 1.25 | — | — |
| $CeO_2$ | — | — | — | — | 0.50 | 0.96 | — | — | 0.50 | 1.27 |
| $Y_2O_3$ | 0.50 | 1.27 | 0.50 | 1.30 | — | — | 0.50 | 2.18 | 0.50 | 0.96 |
| Total | 100.0 | 100.0 | 100.0 | 100.0 | 100.0 | 100.0 | 100.0 | 100.0 | 100.0 | 100.0 |
| $TiO_2 + ZrO_2$ | 3.5 | 3.4 | 4.0 | 3.7 | 3.0 | 2.7 | 3.0 | 2.9 | 3.0 | 2.7 |
| RO | 47.0 | 62.3 | 49.0 | 61.3 | 47.0 | 61.5 | 47.0 | 61.2 | 47.0 | 62.1 |

TABLE 7-8-continued

| Composition | Example 84 | | Example 85 | | Example 86 | | Example 87 | | Example 88 | |
|---|---|---|---|---|---|---|---|---|---|---|
| | mol % | wt % | mol % | wt % | mol % | wt % | mol % | wt % | mol % | wt % |
| Softening point (Ts) (° C.) | 771 | | 777 | | 774 | | 772 | | 771 | |
| Peak crystallization temp (Tp) (° C.) | 936 | | 936 | | 930 | | not detected | | not detected | |
| Tp − Ts | 165 | | 159 | | 156 | | — | | — | |
| Thermal expansion coefficient (α) (50-850° C.) × $10^{-7}$/° C. | 129 | | 128 | | 126 | | 131 | | 136 | |
| Flow diameter (mm) | 17.4 | | 17.3 | | 17.4 | | 17.3 | | 17.3 | |
| Mean particle size $D_{50}$ (μm) | 3.7 | | 6.4 | | 4.2 | | 4.7 | | 4.0 | |

TABLE 7-9

| Composition | Example 89 | | Example 90 | | Example 91 | | Example 92 | | Example 93 | |
|---|---|---|---|---|---|---|---|---|---|---|
| | mol % | wt % | mol % | wt % | mol % | wt % | mol % | wt % | mol % | wt % |
| $SiO_2$ | 43.00 | 31.96 | 46.00 | 31.16 | 49.00 | 32.17 | 49.00 | 31.52 | 52.00 | 40.19 |
| BaO | 18.00 | 34.15 | 30.00 | 51.87 | 28.50 | 47.76 | 31.00 | 50.90 | 18.00 | 35.51 |
| $TiO_2$ | 9.00 | 8.90 | 0.10 | 0.09 | 3.00 | 2.62 | — | — | 3.50 | 3.60 |
| $ZrO_2$ | — | — | — | — | — | — | 0.10 | 0.13 | — | — |
| ZnO | 10.50 | 10.57 | 3.40 | 3.12 | 8.00 | 7.11 | 15.00 | 13.07 | 2.00 | 2.09 |
| CaO | 15.00 | 10.41 | 16.00 | 10.12 | 1.50 | 0.92 | 4.40 | 2.64 | 20.00 | 14.43 |
| MgO | 4.00 | 2.00 | 4.00 | 1.82 | 4.50 | 1.98 | — | — | 4.00 | 2.07 |
| $La_2O_3$ | 0.50 | 2.02 | 0.50 | 1.84 | 0.50 | 1.78 | 0.50 | 1.74 | 0.50 | 2.10 |
| SrO | — | — | — | — | 5.00 | 5.66 | — | — | — | — |
| $Yb_2O_3$ | — | — | — | — | — | — | — | — | — | — |
| $CeO_2$ | — | — | — | — | — | — | — | — | — | — |
| $Y_2O_3$ | — | — | — | — | — | — | — | — | — | — |
| Total | 100.0 | 100.0 | 100.0 | 100.0 | 100.0 | 100.0 | 100.0 | 100.0 | 100.0 | 100.0 |
| $TiO_2 + ZrO_2$ | 9.0 | 8.9 | 0.1 | 0.1 | 3.0 | 2.6 | 0.1 | 0.1 | 3.5 | 3.6 |
| RO | 47.5 | 57.1 | 53.4 | 66.9 | 42.5 | 57.8 | 50.4 | 66.6 | 44.0 | 54.1 |
| Softening point (Ts) (° C.) | 755 | | 745 | | 704 | | 751 | | 791 | |
| Peak crystallization temp (Tp) (° C.) | 896 | | 936 | | 913 | | 904 | | not detected | |
| Tp − Ts | 141 | | 191 | | 209 | | 153 | | — | |
| Thermal expansion coefficient (α) (50-850° C.) × $10^{-7}$/° C. | 100 | | 118 | | 124 | | 118 | | 97 | |
| Flow diameter (mm) | 17.3 | | 17.4 | | 17.2 | | 17.2 | | 17.8 | |
| Mean particle size $D_{50}$ (μm) | 3.3 | | 8.9 | | 3.3 | | 5.8 | | 6.0 | |

TABLE 7-10

| Composition | Example 94 | | Example 95 | |
|---|---|---|---|---|
| | mol % | wt % | mol % | wt % |
| $SiO_2$ | 52.00 | 39.46 | 55.00 | 35.30 |
| BaO | 20.00 | 38.74 | 35.00 | 57.34 |
| $TiO_2$ | 3.50 | 3.53 | 1.00 | 0.85 |
| $ZrO_2$ | — | — | — | — |
| ZnO | — | — | 6.00 | 5.22 |
| CaO | 20.00 | 14.17 | — | — |
| MgO | 4.00 | 2.04 | 3.00 | 1.29 |
| $La_2O_3$ | 0.50 | 2.06 | — | — |
| SrO | — | — | — | — |
| $Yb_2O_3$ | — | — | — | — |
| $CeO_2$ | — | — | — | — |
| $Y_2O_3$ | — | — | — | — |
| Total | 100.0 | 100.0 | 100.0 | 100.0 |
| $TiO_2 + ZrO_2$ | 3.5 | 3.5 | 1.0 | 0.9 |
| RO | 44.0 | 55.0 | 44.0 | 63.9 |
| Softening point (Ts) (° C.) | 800 | | 741 | |
| Peak crystallization temp (Tp) (° C.) | not detected | | 832 | |
| Tp − Ts | — | | 91 | |
| Thermal expansion coefficient (α) (50-850° C.) × $10^{-7}$/° C. | 97 | | 133 | |
| Flow diameter (mm) | 17.9 | | 17.3 | |
| Mean particle size $D_{50}$ (μm) | 4.5 | | 4.0 | |

INDUSTRIAL APPLICABILITY

The glass composition of the present invention can be utilized as a boron-free sealant for sealing metals and ceramics by firing at 850-1050° C. in contact with metals and ceramics and used in such an environment where it is exposed to high temperatures of 850-1000° C. as solid oxide fuel cells (SOFC).

The invention claimed is:

1. A sealing glass composition substantially not containing boron oxide, alkali metal oxides and aluminum oxide, but containing, in mol %,

| | |
|---|---|
| $SiO_2$ | 40-55 |
| BaO | 18-35 |
| $TiO_2 + ZrO_2$ | 0.1-10 |
| ZnO | 0-15 |
| CaO | 0-20 |
| MgO | 0-4.5 |
| SrO | 0-5, and |
| $La_2O_3$ | 0.1-2, | wherein the total content of RO (R: Mg, Ca, Sr, Ba and Zn) is at least 44 mol %, and wherein the glass composition, when fired in a form of glass powder at a temperature of 850-1050° C., turns into a crystallized glass that exhibits a thermal expansion coefficient of $90-150 \times 10^{-7}/°$ C. in the range of 50-850° C.

2. The sealing glass composition of claim 1, wherein the content of SiO2 is 45-50%, the content of $TiO_2 + ZrO_2$ is 1-10%, the content of ZnO is 4-15%, the content of CaO is 1-15%, and the content of MgO is 1-4.5%.

3. The sealing glass composition of claim 1, wherein the content of $SiO_2$ is 45-50%, the content of BaO is 20-30%, the content of $TiO_2 + ZrO_2$ is 1-7%, the content of ZnO is 6-15%, the content of CaO is 3-10%, the content of MgO is 3-4.5%, and the content of $La_2O_3$ is 0.1-1%.

4. The sealing glass composition of claim 1, wherein the content of $SiO_2$ is 45-50%, the content of BaO is 20-30%, the content of $TiO_2 + ZrO_2$ is 1-7%, the content of ZnO is 6-15%, the content of CaO is 3-10%, the content of MgO is 3-4.5%, and the content of $La_2O_3$ is 0.1-0.6%.

5. The sealing glass composition of claim 1, wherein the content of $SiO_2$ is 43-55%, and the content of $La_2O_3$ is 0.1-1%.

6. The sealing glass composition of claim 1, wherein the content of $SiO_2$ is 45-52%, the content of BaO is 22-30%, the content of $TiO_2 + ZrO_2$ is 1-7%, the content of ZnO is 6-15%, the content of CaO is 1-10%, the content of MgO is 3-4.5%, and the content of $La_2O_3$ is 0.1-0.6%.

7. The sealing glass composition of claim 1 comprising one or more chemical species selected from $CeO_2$, $Yb_2O_3$ and $Y_2O_3$ in an amount up to 2 mol % in total.

8. A glass powder consisting of the sealing glass composition of claim 1.

9. The glass powder of claim 8, having a mean particle size of 2-25 μm.

10. A glass powder composition comprising the glass powder of claim 8 and a ceramic filler.

11. A solid oxide fuel cell sealed with a fired body formed by firing the glass powder of claim 8.

* * * * *